Patented July 12, 1949

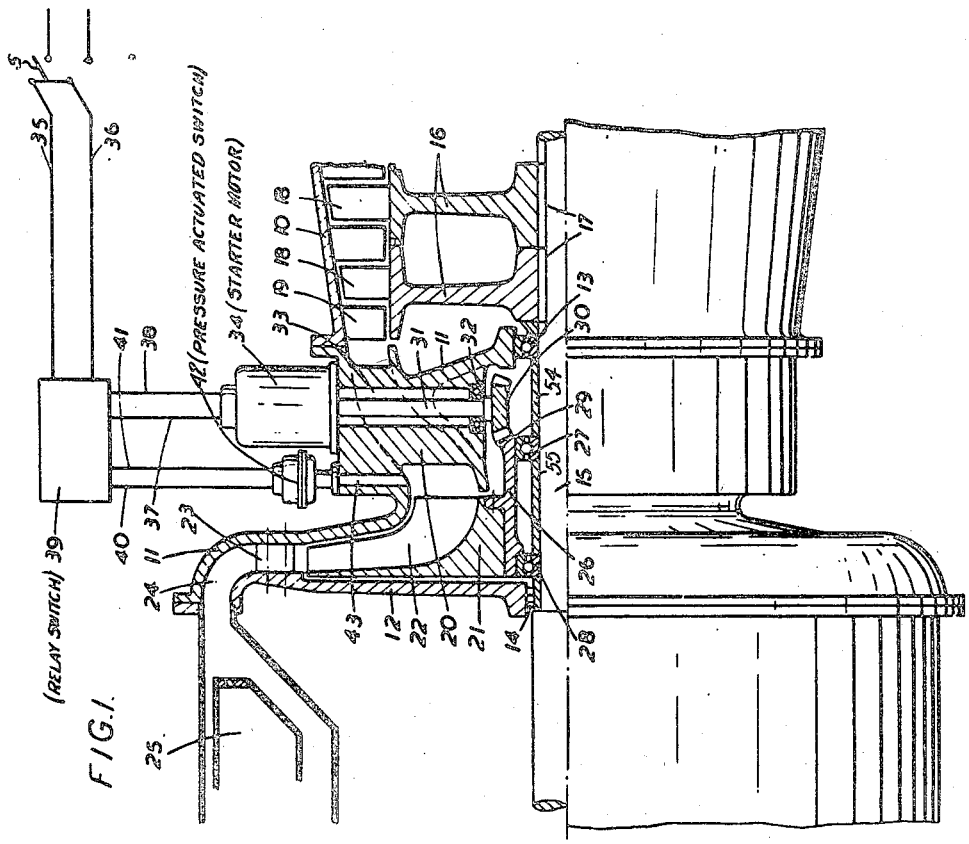

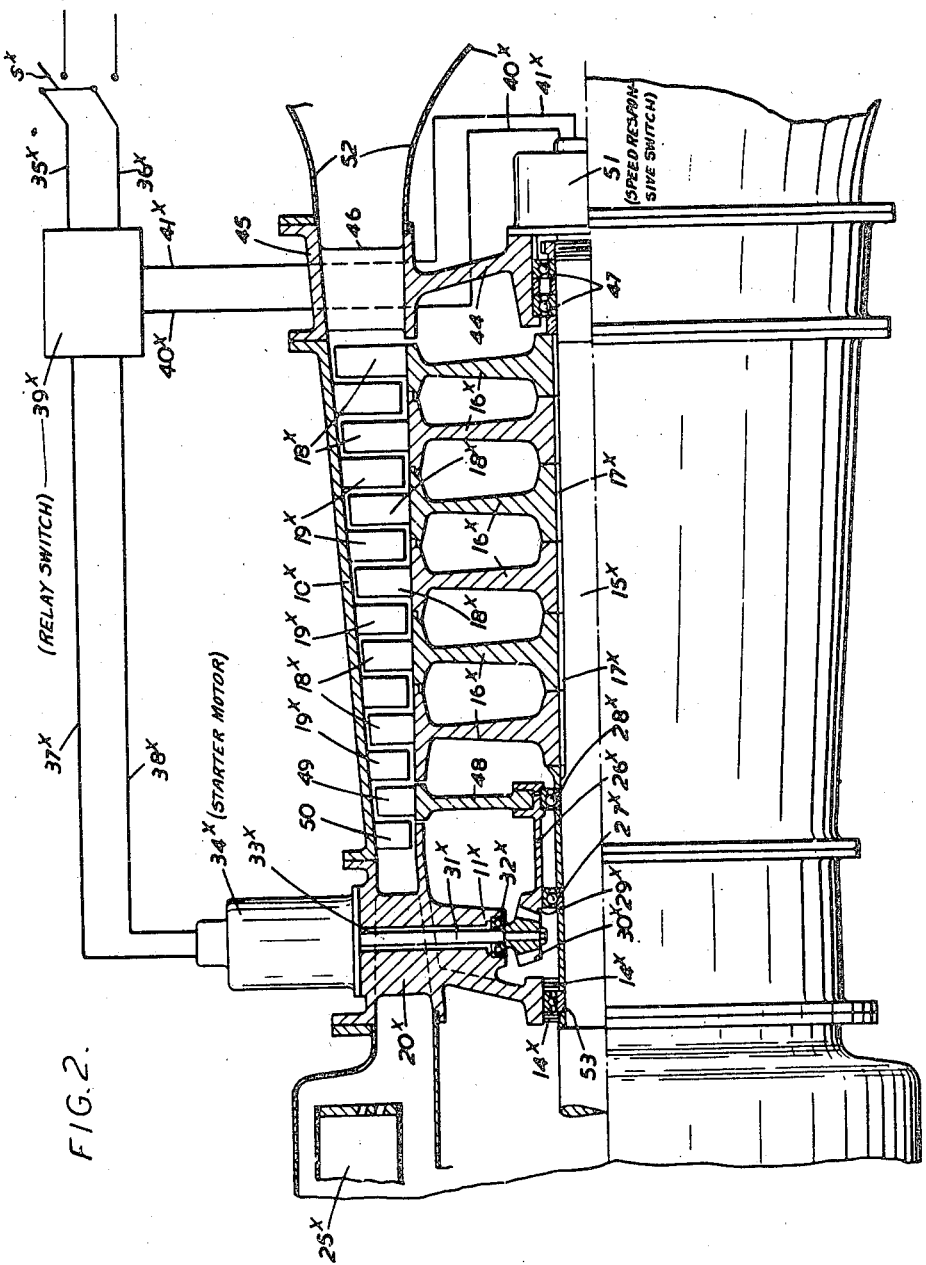

2,476,218

UNITED STATES PATENT OFFICE 2,476,218

INTERNAL-COMBUSTION TURBINE

Arthur James Prime, Rugby, and Leslie Thomas Whitehead, Farnborough, England, and William Rede Hawthorne, Silver Spring, Md., assignors to Power Jets (Research and Development) Ltd., London, England, a British company Application January 31, 1945, Serial No. 575,541
In Great Britain January 31, 1944

13 Claims. (Cl. 60—41)

This invention relates to internal combustion turbine power plants of the type in which air is compressed in a compressor, delivered into combustion chamber means in which fuel is injected and continuously burnt at constant pressure and then expanded to lower pressure in a turbine which drives the compressor.

The main object of the present invention is the provision of new or improved means for facilitating the starting of a power plant of the kind above referred to.

This object is achieved by the provision of auxiliary compressor means, driven by a source of power independent of the turbine and adapted for supplying air under pressure to the combustion chamber means until the turbine is delivering sufficient power to the main compressor for the latter to deliver air to the combustion chamber means at a working pressure sufficient to maintain the power plant in continuous operation.

Another object of the invention is the provision of means for automatically stopping the action of the auxiliary starting compressor means when the working pressure at the main compressor delivery is sufficient to maintain the power plant in continuous operation. The above-mentioned automatic means may include a pressure responsive device subject to the delivery pressure of the main compressor, or a speed responsive device driven by the main compressor and adapted to stop the action of the auxiliary compressor means when the main compressor has reached a speed corresponding to the required delivery pressure.

The auxiliary compressor means is preferably located between the delivery end of the compressor and the combustion chamber means.

How these objects are attained and others as will hereinafter appear and how the invention may be performed will be understood from the following description given by way of example, and having reference to the accompanying drawings of two typical embodiments of the invention, the scope of which is defined in the accompanying claims, and including certain detail modifications.

In the drawings:

Figure 1 is a half axial section (partly diagrammatic) of part of an internal combustion power plant according to the invention.

Figure 2 is a view similar to Figure 1 of a second embodiment of the invention.

In the examples illustrated the power plant comprises an axial flow compressor delivering to one or more combustion chambers, the products of combustion expanding through a turbine which drives the compressor.

In Figure 1, only the high pressure end of the compressor and part of the combustion chamber are shown, the remainder being omitted as having no direct bearing on the present invention.

In both examples illustrated the air on leaving the high pressure end of the compressor and before arriving at the combustion chamber, is passed through a chamber containing an auxiliary starting blower which is of the centrifugal type in Fig. 1 and the axial flow type in Fig. 2 and is arranged for independent drive by a starting device, provided with automatic means for discontinuing the starting effort when the appropriate conditions for continuous operation of the main turbo-compressor system have been attained.

In the embodiments of Figures 1 and 2, the auxiliary starting blower is driven by an electric starter motor, provided with an automatic switching device.

Figure 1 shows a pressure actuated automatic switching device operative to cut off the starting effort when the pressure at the discharge end of the main compressor has reached the appropriate magnitude for continuous running of the turbo-compressor unit; while in Figure 2 the automatic switching device is speed responsive and comes into operation to stop the starting effort when the speed of the main tubo-compressor unit has reached the appropriate magnitude for continuous operation.

Referring to Figure 1 the stator casing of the main axial flow compressor component is shown at 10; it is continued at the high pressure end of the last named component by a fixed housing 11, which is closed at the end towards the left in the drawing by a fixed diaphragm 12. The housing 11 carries a bearing 13 in which is rotatably supported a shaft 15, on which are mounted by means of splined joints 17, a number of compressor rotor wheels 16 carrying rows of rotor blading 18, which co-operate with rows of stator blading 19 mounted on the inner face of the stator casing 10. Where the shaft 15 passes through the diahpragm 12, a pressure retaining gland 14 is provided.

The housing 11 encloses an annular duct leading from the high pressure end of the annular compressor tunnel in which the blading 18, 19 operates, to a chamber formed between (the left hand part of) the housing 11 and the diaphragm 12, continuity of the housing 11 across this duct being provided by means of integral radial webs 20.

Within the chamber enclosed by members 11 and 12 is arranged the rotor 21 of an auxiliary starting centrifugal blower having impeller blades 22. A further series of webs 23 serve structurally to connect members 11 and 12 across the annular space, between the last two named members, receiving the discharge from the impeller 22. These webs may conveniently be formed as guide or diffuser vanes.

The annular opening 24 between the numbers 11 and 12 delivers the air which has passed through the main compressor, the connecting duct and the axiliary blower, into the combustion chamber or chambers 25.

The rotor 21, 22 of the auxiliary blower is mounted on a sleeve 26, which is rotatably supported by bearings 27, 28 located by distance pieces 54, 55 on the main shaft 15. On the sleeve 26 is formed a bevel crown gear 29, engaged by a pinion 30, carried on a shaft 31 supported in a bearing 32 by the housing 11.

A tunnel 33 is bored through the housing 11 to accommodate the shaft 31, the tunnel 33 passing through one of the web members 20 as shown.

The shaft 31 constitutes the output shaft of an electric starter motor 34 of conventional type, mounted on the housing 11. The electrical connections of the motor 34 comprise leads 35, 36 taking current from the main supply, a relay switch contained in a box 39, input leads 37, 38 connecting the relay switch to the motor 34 and switch leads 40, 41 connecting the relay switch to a pressure actuated switch contained in a casing 42.

The pressure sensitive element of the pressure-actuated switch 42 is subjected to the pressure obtaining at the eye of the auxiliary blower 21, 22, communication being established by means of a bore 43 drilled in the housing 11. When the pressure at the eye of the auxiliary blower reaches the selected critical value the pressure sensitive element closes the switch 42 energizing a solenoid or like device in the relay box 39 to open the relay switch and disconnect the main motor input leads 37, 38 from the supply leads 35, 36. The internal details of the pressure actuated switch 42 and of the relay switch contained in the box 39 are not illustrated as they may be of any suitable conventional type, with which those skilled in the art are familiar. The main supply leads 35, 26 will also be provided with a manually controlled master switch S. Before starting, this manually operated switch will be open and as the pressure in the bore 43 will be below the critical pressure the relay switch 39 will be closed. Therefore, on closing the master switch the motor 34 will be energized and will drive the auxiliary blower 21, 22 which will start to build up pressure in the combustion chamber.

At the same time the main fuel supply will be turned on and ignited and the turbine will begin to rotate and drive the main compressor, thus assisting the auxiliary blower to increase the pressure in the combustion chamber. This will in turn increase the output of the turbine so that the whole process of building up the speed of the turbo-compressor assembly and the pressure in the combustion chamber will be cumulative.

When the pressure at the eye of the auxiliary blower has reached a magnitude sufficient for maintaining the turbo-compressor in continuous running, the pressure actuated switch 42 will close and operate the relay to cut off the supply to the motor 34.

The impeller 21, 22 of the auxiliary blower will then slow down and stop and thereafter, in normal running, the impeller vanes 22 will act as stationary guide vanes in the duct leading from the main compressor to the combustion chamber.

Referring to Figure 2, the arrangement is in many ways similar to that shown in Figure 1, corresponding parts being indicated by the same reference numbers but with the addition of the symbol $x$, thus, $10x$ in Figure 2 corresponds to 10 in Figure 1 and so forth.

In Figure 2 the whole of the main compressor is shown, the stator casing $10x$ being completed at the entry end by means of a stationary ring 45 connected by integral radial webs 46 to a flanged diaphragm 44, which supports the main shaft $15x$ in bearings 47.

Members 45, 44 define the annular entry duct of the compressor, the webs 46 acting as guide vanes and an annular air intake scoop is provided by fairings 52 extending from the members 45, 44.

In this example, the auxiliary starting blower is of the axial flow type and comprises a rotor wheel 48 carrying one row of rotor blading 49 and a row of stator blading 50 mounted on the inner face of the stator casing $10x$. The auxiliary blower blading 49, 50 is situated in a continuation of the annular compressor duct, defined by the casing $10x$ and the rims of the main compressor wheels $16x$, and constitutes in effect an additional stage of axial flow compressor blading in continuation of the multi-stage blading $18x$, $19x$ of the main compressor.

The auxiliary rotor wheel 48 is secured to a sleeve $26x$, rotatably supported by means of bearings $27x$, $28x$ on the shaft $15x$. As before, a bevel pinion $30x$ mounted on the shaft $31x$ of the starting motor $34x$ meshes with the crown gear $29x$, and the shaft $31x$ is enclosed in a tunnel $33x$, drilled through the housing member $11x$ and one of its integral webs $20x$, the shaft $31x$ being supported adjacent the bevel pinion $30x$ in a bearing $32x$ by the housing $11x$. The outer part of the latter member is secured to, and forms a continuation of, the stator casing $10x$, and supports a starting motor $34x$, while the inner part of the member $11x$ carries a bearing 53, in which the main shaft $15x$ is rotatably supported.

Packing glands $14x$ prevent the escape of pressure past the bearings 53. As before, the inner and outer portions of the housing $11x$ define the transfer duct from the high pressure end of the compressor assembly to the combustion chamber $25x$, the said outer and inner portions being connected by integral webs $20x$ already mentioned.

The switching arrangements of the starting motor $34x$ are similar to those shown in Figure 1, comprising main feed leads $35x$, $36x$, master switch $Sx$, a relay switch contained in a casing $39x$, motor input leads $37x$, $38x$, and switch leads $40x$, $41x$, the latter connected to an automatic switch contained within a casing 51 and actuated by a centrifugal or other appropriate speed responsive governor.

The casing 51 is secured to the diaphragm 44 supporting the inlet end of the stator casing and receives one end of the main shaft $15x$, which actuates the governor mechanism within casing 51. Details of this mechanism and the switch actuated thereby are not illustrated as they may be of any appropriate conventional type, with which those skilled in the art are familiar.

The only essential differences between this arrangement and those shown in Figure 1 are:

(a) An axial flow auxiliary starting blower is employed and (b) The automatic switch for cutting out the starting motor is governor actuated instead of pressure actuated and operates the relay when a selected critical speed has been attained.

In both the examples given it will be noted that the channels of the auxiliary blower constitute diffuser means having the effect of converting into static energy the dynamic energy in the air delivered by the main compressor as it flows through the said channels prior to its entry into the combustion chamber.

What we claim as our invention and desire to secure by Letters Patent is:

1. A continuous combustion gas turbine power plant comprising a main compressor, combustion means receiving air delivered from said compressor, a turbine arranged to be driven by the combustion products from said combustion means and to drive said main compressor mechanically, a secondary compressor co-axial with and rotatable independent of said main compressor and arranged between the high pressure side thereof and said combustion means, and power input means to drive said secondary compressor.

2. A continuous combustion gas turbine power plant comprising a main compressor, combustion means receiving air delivered from said compressor, a turbine arranged to be driven by the combustion products from said combustion means and to drive said main compressor mechanically, a secondary compressor co-axial with and rotatable independent of said main compressor and arranged between the high pressure side thereof and said combustion means, power input means to drive said secondary compressor, and means for automatically stopping the rotation of said secondary compressor when the load taken by the main compressor attains a selected value.

3. A power plant according to claim 2 comprising diffuser means including the channel system of the secondary compressor to convert dynamic into static energy in the air delivered by said main compressor prior to the entry of the said air into said combusion means.

4. A power plant according to claim 2 wherein the automatic stopping means is responsive to a function of the load taken by the main compressor.

5. Power plant according to claim 2 wherein the main compressor is a multistage axial compressor and the secondary compressor is a single stage centrifugal compressor.

6. The combination as claimed in claim 2, wherein the mentioned power means comprises an electric motor and the mentioned automatic means includes switch means controlling the input to the motor.

7. The combination as claimed in claim 2, wherein the mentioned automatic means includes pressure responsive switch means and electrical relay means.

8. A power plant according to claim 2 comprising means including the channel system of the secondary compressor to raise the pressure of air delivered by said main compressor prior to the entry of said air into said combustion means.

9. The combination as claimed in claim 8, wherein the secondary compressor includes axial flow compressor elements.

10. The combination as claimed in claim 8, wherein the secondary compressor includes a centrifugal impeller.

11. A power plant according to claim 2 wherein the automatic stopping means is responsive to the speed of the main compressor.

12. The combination as claimed in claim 11, wherein the mentioned automatic means includes speed responsive means driven by the main compressor, switch means actuated thereby and electrical relay means.

13. A continuous combustion gas turbine power plant comprising a main compressor, a secondary compressor arranged in series with the throughput from the main compressor and rotatable independently thereof, combustion means arranged to receive air delivered by or through said secondary compressor, a turbine arranged to be driven by the combustion products of said combustion means and to drive said main compressor mechanically, and diffuser means forming a channel system to convert dynamic into static energy in the air delivered by said main compressor prior to the entry of the air into said combustion means and including channels of said secondary compressor as part of this diffuser system.

ARTHUR JAMES PRIME.
LESLIE THOMAS WHITEHEAD.
WILLIAM REDE HAWTHORNE.

REFERENCES CITED

The following references are of record in the file of this patent:

UNITED STATES PATENTS

| Number | Name | Date |
|---|---|---|
| 2,096,184 | Lasley | Oct. 19, 1937 |
| 2,176,021 | Grutzner | Oct. 10, 1939 |
| 2,358,301 | Brauns | Sept. 19, 1944 |

FOREIGN PATENTS

| Number | Country | Date |
|---|---|---|
| 549,285 | Great Britain | Nov. 13, 1942 |